Dec. 8, 1953  B. E. O'CONNOR  2,661,915
AIRCRAFT LANDING WHEEL SHIMMY DAMPER
Filed June 4, 1949 2 Sheets-Sheet 2
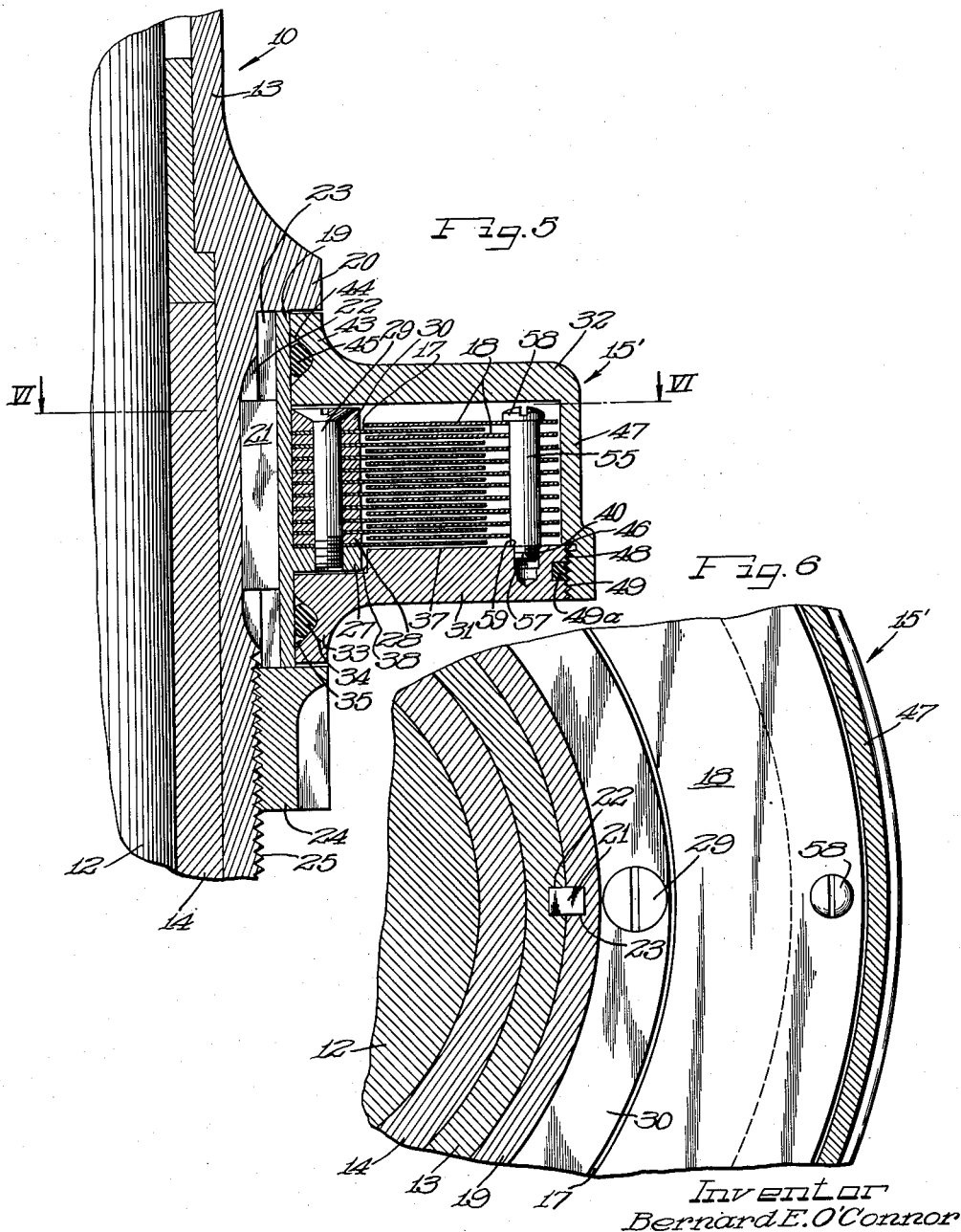
Inventor
Bernard E. O'Connor
By The Firm of Charles W. Hill, Attys Patented Dec. 8, 1953

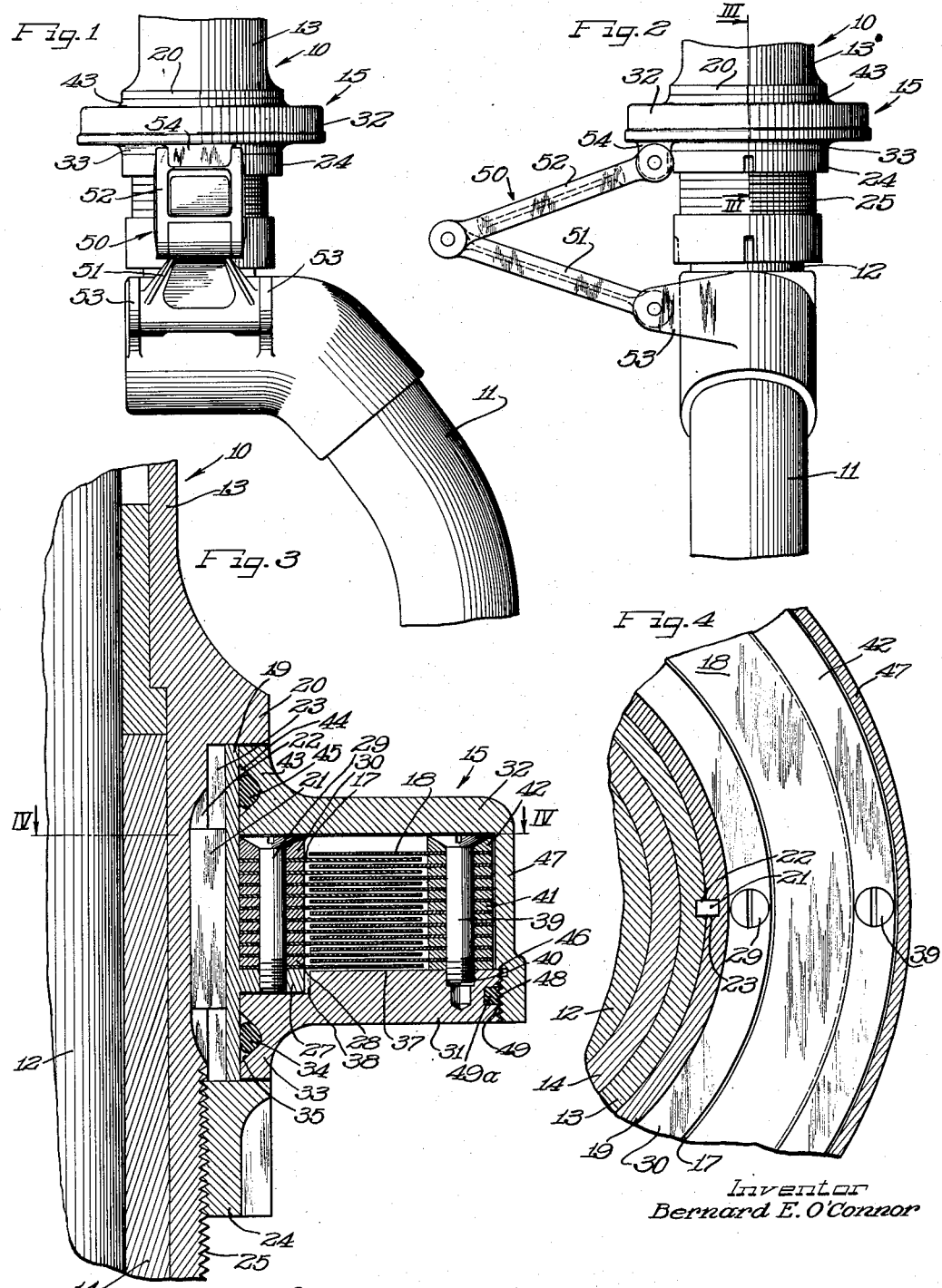

2,661,915

UNITED STATES PATENT OFFICE 2,661,915

AIRCRAFT LANDING WHEEL SHIMMY DAMPER

Bernard E. O'Connor, Buffalo, N. Y., assignor to Houdaille-Hershey Corporation, Detroit, Mich., a corporation of Michigan Application June 4, 1949, Serial No. 97,231

20 Claims. (Cl. 244—103)

This invention relates to improved means for preventing shimmy in relatively swiveling structures, and is more particularly concerned with preventing shimmy in wheel supporting structures such as swiveling aircraft landing wheel assemblies.

An important object of the present invention is to provide a shimmy damper construction which is adapted for use in an assembly wherein relative swiveling movement is a functional requirement but which, due to various factors, is subject to vibrations or air pressure forces tending to effect a shimmy action in one of the relatively swiveling structures.

Another object of the invention is to provide a shimmy damper construction which is especially useful in swiveling landing wheel assemblies of aircraft and is adapted to be incorporated therein without substantially altering the general structural relationships of the operating components of the wheel assembly.

A further object of the invention is to provide a shimmy damper which is especially constructed for use in the slip ring of the torque scissors connection with the strut of a swivel type aircraft wheel assembly.

Still another object of the invention is to provide a shimmy damper, especially useful for use in aircraft landing wheel assemblies, which is operable with substantially equal efficiency under great extremes of temperature conditions.

A still further object of the invention is to provide an improved shimmy damper for the general purposes described which is simple in construction, economical to produce and assemble and durable and efficient in service.

Other objects, features and advantages of the present invention will be readily apparent from the following detailed description of a preferred embodiment taken in conjunction with the accompanying drawings, in which:

Figure 1 is a fragmentary rear elevational view of a swivel type aircraft landing gear showing the connection between the relatively swiveling portions of the gear;

Figure 2 is a side elevational view of the portion of the landing gear shown in Figure 1;

Figure 3 is an enlarged fragmentary detail sectional view through the slip ring and shimmy damper structure, taken substantially on the line III—III of Figure 2;

Figure 4 is a fragmentary horizontal sectional view taken substantially on the line IV—IV of Figure 3;

Figure 5 is a sectional view similar to Figure 3 but showing a slightly modified damper structure; and Figure 6 is a fragmentary horizontal sectional view taken on substantially the line VI—VI of Figure 5.

The present invention is well adapted for use with an aircraft landing wheel assembly such as shown in Figures 1 and 2 for damping shimmy in the wheel and the wheel carriage. Such a wheel carriage includes a strut 10 which is generally of the oleo strut type and a swivel leg or wheel yoke 11 which carries the stud shaft providing the wheel axle (not shown). Projecting from the yoke 11 is a cylinder 12 which extends rotatably and reciprocably up into a cylindrical tubular casing 13 having bearing structure 14 therein for the cylinder 12.

In order to dampen shimmy in the wheel supporting gear including the yoke 11, a novel shimmy damper assembly 15 is provided. This damper has a working amplitude of 360° so as to permit full turning of the wheel about the axis of the cylinder 12. It is operable with substantially constant efficiency under extremes of temperature variations. It is highly efficient for damping shimmy, that is, rapid rotary or oscillatory movements and especially such movements tending to assume an undesirable vibrational frequency, while nevertheless permitting free and substantially unrestrained steering or turning movements as necessitated in maneuvering the associated aircraft on the ground. To this end, the shimmy damper 15 comprises means operable in the presence of a viscous fluid operating on the principle of the torque resistance of shear films of the viscous fluid operating between opposed parallel working surfaces relatively movable in their respective planes. The opposed working surfaces are provided by a set of thin flat parallel disks 17 mounted stationary with the strut casing 13 and an interleaved uniformly inter-spaced set of thin parallel disks 18 mounted to move rotatably or oscillatably with the wheel yoke 11.

Mounting of the set of disks 17 on the tubular strut casing 13 is accomplished through the medium of a hub ring 19 which encircles the casing 13 below an annular limit shoulder flange 20 on the casing. A fixed nonrotary relation between the ring hub 19 and the casing is effected by means of a key member 21 fitting in a keyway 22 in the casing 13 and a keyway 23 in the inner periphery of the hub ring. The axial position of the hub ring 19 against the shoulder 20 is maintained by a nut 24 turned up on a threaded peripheral portion 25 of the strut casing tight against the lower edge of the ring hub.

Means for connecting the disks 17 to the ring hub 19 comprises an integral disk supporting ledge flange 27 projecting peripherally outwardly on the ring hub 19 spaced from its lower edge and upon which the inner margins of the disks 17, which for the present purpose are annularly dimensioned to be received coaxially about the ring hub 19, are stacked with appropriate spacer rings 28 therebetween as required. Fixed attachment of the stack of disk plates 17 upon the supporting ledge flange 27 is effected by means such as a plurality of screws 29 threaded into the flange 27 and having the heads thereof in compressing relation to an upper clamping ring 30. As a result, the spaced damper disks 17 are supported on the strut casing 13 and are held against rotary movement relative thereto. However, assembly of the disk unit with the casing 13 is a simple and easy production expedient.

Means for supporting the interleaved damper disks 18 operatively relative to the set of damper disks 17 include structure mounted for relative rotary movement on the strut casing 13 and providing a fluid tight closure about the cooperating disk assemblies. To this end, a disk supporting rotary annular plate 31 is provided which is rotatably mounted on the hub member 19. A closure member 32 in the form of an annulus of generally L-shape cross-section is also rotatably mounted on the hub member 19 and cooperates with the plate 31 to provide the fluid tight closure about the cooperating sets of damper plates or disks 17 and 18.

For rotary cooperation with the hub member 19, the plate 31 is formed with an inner marginal outwardly axially extending hub or bearing flange 33 in close sliding bearing engagement about the hub member 19 between the disk supporting flange 27 of the hub member and the hub engaging and clamping end of the hub retaining nut 24. The space between the end of the nut and the adjacent face of the disk retaining flange 27 is sufficient to afford slight clearance for free rotary movement of the flange 33 of the plate member 31.

Fluid seal between the flange 33 and the bearing surface of the hub member 19 is afforded by means such as an O-ring 34 maintained under compression within an annular groove 35 of generally V cross-section provided in the bearing surface of the flange 33.

The inner surface of the rotary supporting plate 31 provides a working surface 37 operatively opposing the adjacent face of the endmost damper disk 17. A groove 38 formed in the inner margin of the surface 37 provides clearance for the disk supporting flange 27 of the hub member.

The working surface disks 18 are secured in a spaced uniform stack, interleaved operatively with the disks 17, by means of screws 39 secured threadedly into threaded bores 40 in the outer margin of the working surface 37 of the plate 31. Spacer rings 41 may be interposed between the working disks 18, and a clamping ring 42 may be interposed between the heads of the screws 39 and the adjacent endmost working disk 18.

In certain respects the annular closure member 32 is constructed similarly to the plate 31, in that the closure member is formed with an inner marginal axially outwardly projecting hub flange 43 in slidable rotary bearing engagement with the hub member 19 and is formed with a generally V-shaped annular groove 44 within which an O-ring sealing ring 45 is maintained under sealing compression.

In assembling the carrying plate 31 and the closure annulus 32, an internal stop shoulder 46 on an angular outer marginal flange 47 by engagement with the margin of the plate 31 defines the proper relationship of these components. A tight joint is provided by means of threads 48 on the internal margin of the flange 47 engaging with threads 49 on the plate periphery, a thread sealing ring 49a being set into the threaded plate periphery.

It will thus be apparent that the damper 15 provides a compact unitary assembly that is efficiently constructed of easily manufactured parts which can be assembled quickly and easily as a unit and then assembled with the strut casing 13. Thus, prior to assembly with the strut casing 13, the hub member 19 has the carrying disk or plate 31 assembled therewith and the interleaved sets of operating disks 17 and 18 are then stacked in interleaved relation with the apppropriate spacers 28 and 41 therebetween, and the disk assemblies then secured in place on respectively the supporting flange 27 of the hub and the carrying plate 31. Thereafter the closure member 32 is assembled with the hub 19 and threaded into assembly with the carrying plate 31. By appropriate relative threading of the carrying plate 31 and the cover member 32, accurate, uniform spacing between the interleaved disks 17 and 18 can be accomplished since after the damper unit has been assembled with the strut casing 13 and secured in place by the retaining nut 24 engaging against the adjacent end of the hub member 19 to clamp the same agaist the shoulder flange 20, the outer end of the cover member flange 43 may engage in sliding bearing relation against the shoulder flange 20 and thus limit the axial movement of the cover 32 toward the shoulder flange 20 and thereby also limit the approach of the face of the groove 38 in the carrying plate 31 toward the adjacent face of the supporting flange 27 of the hub. In consequence, the position of the disks 18 with respect to the opposing disks 17 can be regulated with some accuracy. However, while primary adjustment can be effected as just described by reason of the threaded interengagement of the carrying plate 31 and the enclosing annulus 32, a certain amount of axial freedom of self-adjustment is permitted in the carrying plate and closure annulus assembly so that the disks 18 can find an optimum uniformly spaced relation with respect to the operating disks 17 in the operation of the unit, the spacing between the ends of the flanges 33 and 43 and the opposing retaining surfaces being afforded for this purpose but to a very limited extent since only slight adjustments in this respect will need to occur in operation.

To the extent thus far described, the cooperating damper disks 17 and 18 are freely relatively rotatably supported, that is, the disks 18 which are in fixed assembly with the supporting plate 31 and the closure or cover annulus 32 will move entirely free from the disks 17 upon rotation of the plate and cover assembly 31, 32 about the strut casing 13. In this unit the damping of shimmy movement is the function of a viscous fluid. For example, a silicone fluid of 30,000 centistokes viscosity rating as measured in a Saybolt viscosimeter has been used with excellent results. This fluid is operable with substantial uniformity throughout an extreme range of temperature conditions and is therefore especially valuable for aircraft landing gear. A fill of this fluid is enclosed within the chamber provided by the supporting plate 31 and the cover member 32 and the hub or bearing member 19, and fills all of the spaces between the interleaved set of operating disks 17 and 18. The spacing between the opposing working surfaces of the disks and between the working surface 37 of the supporting plate and the adjacent disk 17 is greater than a mere lubricating film but is much closer than will result in a mere fluid frictional drag relationship between the disks and the viscous fluid, being so calculated that a shear film of the viscous fluid exists between each pair of opposing working surfaces. The working surface spacing is properly correlated to the viscosity of the fluid to afford a linear velocity gradient, as distinguished from a non-linear velocity gradient. That is, the laminar layers of fluid between the opposing working surfaces are, due to the relative closeness of the spacing between the surfaces in a condition of shear rather than in a fluid drag relationship.

In explanation it may be stated that the velocity of a laminar layer of fluid is equal to the velocity of the moving boundary times the distance from stationary boundary to the layer in question divided by the distance between boundaries if the proportion of the viscosity to the distance between the boundaries is sufficiently high. This can be shown graphically by a straight diagonal line tilting in the direction of movement of the moving surface to represent linear velocity gradient, and a curving line from the stationary surface to the moving surface to represent non-linear velocity gradient where the surfaces are further apart than will result in a linear velocity gradient when considered with respect to the viscosity of the fluid in question. Thus, while the fluid will allow comparatively free relative rotary movement of the working disks 17 and 18, during slow relative rotary movements of the assembly, rapid relative rotary movements are resisted due to the shear resistance of the films of the viscous fluid between the working surfaces.

In order to afford a coupling between the wheel yoke 11 and the slip ring shimmy damper 15, a torque scissors 50 is provided which comprises a pair of links 51 and 52 pivotally connected together at their outer ends. The inner end of the link 51 is connected pivotally between bosses or ears 53 on the wheel yoke, and the corresponding end of the link 52 is connected pivotally to a boss 54 on the shimmy damper casing. Through this arrangement vertical movements between the wheel yoke 11 and the shimmy damper 15 as occasioned by operation of the oleo strut 10 are accommodated but nevertheless the slip ring structure of the shimmy damper 15 is connected to move rotatably with the wheel yoke 11. As a result, rapid oscillatory, vibrational, shimmy movements of the wheel and the yoke 11 are dampened by the viscous shear film action of the viscous fluid within the shimmy damper 15 working in the close linear gradient or shear film spacings between the working surfaces within the damper.

A reduction in the number of parts and simplification in assembly during manufacture of the shimmy damper unit can be effected as shown in the modification of Figures 5 and 6 by eliminating the spacers between one set of the interleaved working disks. To this end, the damper unit identified as 15' may be constructed substantially like the slip ring damper unit 15 with the exception of the omission of the spacers between one of the sets of disks, herein the set of working disks 18 which are supported by the carrying plate 31 of the casing assembly. Since all parts of the damper unit with certain limited exceptions to be noted are identical with the parts of the unit 15, similar reference numerals have been applied to the identical parts.

While the working disks 17 carried by the hub ring 19 have the spacers 28 therebetween to hold such disks in predetermined working clearance relation, the working disks 18 are merely interleaved with respect to the working disks 17 and are retained in substantially relative floating relation but in non-rotatable position with respect to the supporting plate 31 by means of screw studs 55. Each of the studs 55 has a smaller diameter threaded lower extremity 57 threaded into the carrying plate 31 and an opposite extremity head 58. The disks 18 are, of course, appropriately apertured to pass the studs 55 therethrough and are free floating longitudinally of the studs so that in operation the disks 18 can assume a proper spaced relation automatically with respect to the cooperating working disks 17 under the influence of the viscous damping fluid working in the shear film spaces between the opposed working disks. That is, when the damper casing is rotated or oscillated rapidly relative to the hub ring 19 the viscous resistance of the damping fluid within the damping unit acting on the working surfaces of the working disks causes the floating working disks 18 to assume automatically substantially optimum equalized spacing with respect to opposing surfaces of the stationary working disks 17. As a result the unit operates with high damping efficiency.

Where, as shown, the uppermost disk of the assembly is one of the working disks 18, the heads 58 of the retaining studs 55 define the upward limit of movement of the upper working disks to retain the same during damping service in the proper shear film spaced relation to the uppermost working disk 17. In order to attain this relationship automatically during assembly, the lower extremity portions of the studs 55 above the reduced diameter threaded portions 57 are formed with respective shoulders 59 defining the relative vertical position of the studs by engagement with the adjacent upper surface of the carrying plate 31.

I claim as my invention:

1. In combination in an aircraft landing wheel gear, a fixed strut, a wheel carrying member rotatably secured to the strut, a housing structure rotatably surrounding the strut, said housing structure having an annular chamber therein, a set of disks stationary with and encircling the strut extending into said chamber, a second set of disks interleaved with said stationary disks and rotatable with said housing structure, and a connection externally of said strut between the housing structure and the wheel-carrying member for rotation of the housing structure with the wheel-carrying member, said chamber having a viscous fluid therein and said disks having opposed working surfaces operatively in shear film spacing with respect to said fluid so that rapid relative rotary movements of the disks are restrained by the shearing action of the fluid between the working surfaces of the disks.

2. In combination in an aircraft landing gear including a strut and a wheel-carrying member relatively rotatably connected thereto, an annular housing structure externally surrounding and rotatable about said strut, torque scissors means connecting the housing structure for joint rotation with the wheel carrying member, and shimmy damping means within said housing structure.

3. In combination in an aircraft landing gear assembly, a vertical strut, a wheel supporting yoke rotatably connected with said strut, a housing structure externally of said strut and including a bearing hub fixedly attached externally about the strut and including a casing providing an annular chamber encircling the hub and relatively rotatable about said hub, a torque scissors connecting said casing with said wheel yoke, a set of spaced flat disks carried by and held against rotation by the hub and projecting into the chamber, and a set of flat disks carried by and rotatable with the casing within the chamber and interleaved with the disks carried by the hub, the operative spacing between the opposing disk surfaces being closely spaced and coacting with a viscous damping fluid within the chamber to afford shear films of the fluid between the opposed surfaces of the disks.

4. In combination in an aircraft landing gear assembly, a strut having a cylindrical casing, a shimmy damper bearing hub secured fixedly to and externally of said casing, a plurality of spaced working disks disposed radially and externally about and secured to said bearing hub, and a rotary assembly mounted on and surrounding said bearing hub and having a casing defining an annular chamber enclosing said disks, said casing carrying within said chamber and rotatable therewith a set of disks extending radially inwardly toward the hub member and interleaved with the hub disks with an operative shear film spacing between the opposing working surfaces of the disks for coacting with viscous damping fluid therebetween to effect shimmy damping.

5. In combination in an aircraft landing gear assembly, a strut having a cylindrical casing, a shimmy damper bearing hub secured to said casing, a plurality of spaced working discs disposed radially about and secured to said bearing hub, and a rotary annular assembly about said bearing hub and having a casing defining an annular chamber enclosing said disks, said casing carrying within said chamber and rotatable therewith a set of disks extending radially toward the hub member and interleaved with the hub disks with an operative shear film spacing between the opposing working surfaces of the disks for accommodating viscous damping fluid therebetween, said casing including a generally L-shaped closure member and a plate member secured together to provide the chamber and with the slip ring disks secured to the plate member.

6. In combination in an aircraft landing gear strut including a cylindrical casing, said casing having a shoulder flange thereon, a bearing hub surrounding said casing and engaging at one end against said shoulder flange, a nut threaded onto said casing and engaging the opposite end of the hub to secure the hub against the shoulder flange, a key retaining said hub against relative rotation on the casing, and an annular structure defining an annular chamber therein rotatably secured in place on said hub between said shoulder and said nut, shimmy damping means within said chamber, and means for connecting the annular structure to a wheel carrying member.

7. In combination in an aircraft landing gear shimmy damper, a bearing hub ring, an annular assembly rotatable about the hub ring, said annular assembly having an annular chamber therein opening toward and closed by the hub ring, a set of spaced damper disks carried by the hub ring and projecting radially therefrom into said chamber, and a cooperating set of spaced, interleaved damper disks carried by the annular assembly within the chamber and interleaved with the hub disks.

8. In combination in a slip ring shimmy damper for aircraft landing gear, a hub ring adapted to be secured to a landing gear strut, an annular structure slidably rotatable about said hub, said annular structure comprising a cover member and a plate threadedly interengaged and defining an annular chamber with said hub ring, said hub ring having a radial supporting flange thereon extending into said chamber, a set of damper disks and spacers stacked on said flange and secured fixedly thereto, and a set of damper disks and spacers stacked on and secured to said plate within said chamber, said sets of disks being interleaved.

9. In combination in a slip ring shimmy damper for aircraft landing gear, a hub ring adapted to be secured to a landing gear strut, an annular structure slidably rotatable about said hub, said annular structure comprising a cover member and a plate threadedly interengaged and defining an annular chamber with said hub ring, said hub ring having a radial supporting flange thereon extending into said chamber, a set of damper disks stacked on said flange and secured thereto, a set of damper disks stacked on and secured to said plate within said chamber, said sets of disks being interleaved, said chamber being filled with viscous damping fluid, and means between the cover member and the plate and the hub ring providing fluid seals to prevent leakage of the fluid from the chamber.

10. In combination in a slip ring shimmy damper for aircraft landing gear, a hub ring adapted to be secured to a landing gear strut, an annular structure rotatable about said hub, said annular structure comprising a cover member and a plate interengaged and defining an annular chamber with said hub ring, said hub ring having a radial supporting flange thereon extending into said chamber, a set of damper disks stacked on said flange and secured thereto, and a set of damper disks stacked on and secured to said plate within said chamber, said sets of disks being interleaved.

11. In combination in a slip ring shimmy damper for use in aircraft landing gear, a ring hub, an annular radially extending plate rotatable about said hub, an annular generally L-shape cross-section cover member assembled with said plate and also rotatable about the hub, the hub having a radially outwardly extending integral flange, a set of spaced disks mounted on said flange and projecting radially relative to the hub into said chamber, a set of similar complementary cooperating disks mounted on said plate and operatively interleaved with the hub disks, the plate having a groove therein for clearing said hub flange, the inner surface of the plate being spaced in working relation to the adjacent hub carried disk.

12. In combination in an aircraft landing gear including a strut, a strut casing, said strut casing having an annular outwardly projecting shoulder flange, a slip ring hub about said casing and having an end engaging said shoulder flange, a nut securing said hub against said shoulder flange by engagement of the opposite end of the hub, said hub carrying a plurality of radially extending spaced shimmy damper disks, and an annular structure rotatably carried by said hub between said shoulder and said nut and having a chamber therein enclosing a set of shimmy damper disks carried by the annular structure and interleaved with respect to the hub-carried disks, the sets of disks being so related that operative working clearance therebetween affords shear films of viscous fluid between the opposed working surfaces of the disks, one of said sets of disks being axially movable to assume working spaced relation to the disks of the other set automatically in service.

13. A shimmy damper device for use in conjunction with a directionally adjustable aircraft landing wheel strut of the type including a pair of relatively rotatable support members, said shimmy damper device comprising an annular housing mounted to encircle one of said strut members in rotatable relation thereon, key means formed upon said one of said support members within the configuration of said housing member, means linking said housing member to the other of said support members for rotation therewith relative to the first mentioned support member, and resistance means comprising a plurality of resistance members slip-fitted into laminar relation within said housing, alternate of said resistance members being keyed to said support key means and to said housing respectively, and a viscous fluid substantially filling said housing and the spaces between said resistance members whereby to cling to said resistance members and to resist relative movements of adjacent resistance members by resistance of the fluid to shear.

14. A shimmy damper device for use in conjunction with a directionally adjustable aircraft landing wheel strut of the type including a pair of relatively rotatable and telescopically disposed inner and outer strut members, said shimmy damper device comprising a housing mounted outside of one of said strut members in rotatable relation thereon, means connecting said housing to the other of said strut members for rotation therewith relative to said one of said strut members, and friction means comprising an element disposed within said housing and keyed to said one of said strut members, spacing means maintaining said element in slightly spaced relation to said housing, and a viscous fluid substantially filling said housing and the spaces between said element and said housing whereby to cling to said element and to thereby resist relative movements of said element and said housing by resistance of the fluid to shear.

15. In combination in an aircraft landing gear including a strut member and a wheel-carrying member relatively rotatably connected thereto, an annular housing structure externally surrounding and rotatable about one of said members, torque scissors means connecting the housing structure for joint rotation with the other of said members, and shimmy damping means within said housing structure.

16. In combination in a slip ring shimmy damper for aircraft landing gear, a hub ring adapted to be secured non-rotatably to a landing gear strut, an annular structure rotatable about said hub ring defining therein an annular chamber of substantial radial depth and opening toward said hub ring, and a damper disk non-rotatably disposed with respect to said hub ring and extending into said chamber, said disk having opposite axially facing working surfaces and said annular structure having within said chamber working surfaces disposed in closely spaced parallel working relation to the working surfaces of said disk so that viscous damping fluid confined within said chamber will afford shear resistance to relative rotary movement of said annular structure and said disk, said annular structure having means thereon for operative attachment to a landing gear member rotatable relative to the gear strut.

17. In combination in an aircraft landing gear including a strut member and a wheel-carrying member relatively rotatably connected thereto, an annular housing structure externally surrounding and rotatable about one of said members, torque scissors means connecting the housing structure for joint rotation with the other of said members, and shimmy damping means within said housing structure and comprising a member non-rotatably attached to said one of said members and having working surfaces disposed in closely spaced parallel relation to working surfaces provided within said housing and adapted to provide a shear film coupling in the presence of a viscous fluid within said housing.

18. A shimmy damper device for use in conjunction with a directionally adjustable aircraft landing wheel strut of the type including a pair of relatively rotatable and telescopically disposed members, said shimmy damper device comprising an annular housing mounted to encircle one of said strut members in rotatable relation thereon, key means formed upon said one of said strut members within the configuration of said housing, means operably connecting said housing to the other of said strut members for rotation therewith relative to the first mentioned strut member, and friction means comprising a plurality of annular plates arranged in stacked relation within said housing, alternate of said plates being keyed to said strut key means and to said housing respectively, spacer means disposed between said stacked plates to maintain them in slightly spaced relation, and a viscous fluid substantially filling said housing and the spaces between said plates whereby to cling to said plates and to resist relative movements of adjacent plates by resistance of the fluid to shear.

19. A shimmy damper device for use in conjunction with a directionally adjustable aircraft landing wheel strut of the type including a pair of relatively rotatable members, said shimmy damper device comprising an annular housing mounted to encircle one of said strut members in rotatable relation thereon, key means formed upon said one of said strut members within the configuration of said housing, means connecting said housing to the other of said strut members for rotation therewith relative to the first mentioned strut member, and friction means comprising a selected plurality of plates arranged in stacked relation within said housing, alternately stacked plates being keyed to said strut key means and to said housing respectively, spacer means disposed between said stacked plates to maintain them in slightly spaced relation, and a viscous fluid substantially filling said housing and the spaces between said plates whereby to cling to said plates and to thereby resist relative movements of adjacent plates by resistance of the fluid to shear.

20. A shimmy damper device for use in conjunction with a directionally adjustable aircraft landing wheel strut of the type including a pair of relatively rotatable inner and outer strut members, said shimmy damper device comprising an annular housing mounted to encircle one of said strut members in rotatable relation thereon, means connecting said housing to the other of said strut members for rotation therewith relative to said one of said strut members, and friction means comprising an annular plate disposed within said housing and keyed to said one of said strut members, spacing means maintaining said plate in slightly spaced relation to said housing, and a viscous fluid substantially filling said housing and the spaces between said plate and said housing whereby to cling to said plate and to thereby resist relative movements of said plate and said housing by resistance of the fluid to shear.

BERNARD E. O'CONNOR.

References Cited in the file of this patent

UNITED STATES PATENTS

| Number | Name | Date |
|---|---|---|
| 1,718,175 | Nilson | June 18, 1929 |
| 2,061,656 | Guthrie | Nov. 24, 1936 |
| 2,333,550 | Parker | Nov. 2, 1943 |
| 2,367,993 | Bishop | Jan. 23, 1945 |